United States Patent
Iyer et al.

(10) Patent No.: US 11,095,110 B1
(45) Date of Patent: Aug. 17, 2021

(54) ENERGY HARVESTING FROM FAULT CURRENTS

(71) Applicant: Smart Wires Inc., Union City, CA (US)

(72) Inventors: Amrit Iyer, Oakland, CA (US); Andrii Luchko, Foster City, CA (US); Qi Tang, Calgary (CA); Yuli Starodubstev, Hampstead, NC (US)

(73) Assignee: Smart Wires Inc., Union City, CA (US)

( * ) Notice: Subject to any disclaimer, the term of this patent is extended or adjusted under 35 U.S.C. 154(b) by 156 days.

(21) Appl. No.: 16/452,278

(22) Filed: Jun. 25, 2019

Related U.S. Application Data

(60) Provisional application No. 62/691,234, filed on Jun. 28, 2018.

(51) Int. Cl.
| | |
|---|---|
| *H02H 1/06* | (2006.01) |
| *H02H 3/16* | (2006.01) |
| *H02H 3/06* | (2006.01) |
| *H01H 71/12* | (2006.01) |
| *H01F 27/42* | (2006.01) |
| *H02J 3/00* | (2006.01) |

(52) U.S. Cl.
CPC ........... *H02H 3/162* (2013.01); *H01F 27/427* (2013.01); *H01H 71/12* (2013.01); *H02H 1/063* (2013.01); *H02H 3/06* (2013.01); *H02J 3/001* (2020.01)

(58) Field of Classification Search
CPC ........ H02H 1/063; H02H 3/06; H01F 27/427; H02J 3/01
See application file for complete search history.

(56) References Cited

U.S. PATENT DOCUMENTS

| | | | |
|---|---|---|---|
| 4,758,919 A * | 7/1988 | Stewart | H02H 3/06 361/114 |
| 6,075,349 A * | 6/2000 | Okayama | H02J 3/1814 323/207 |
| 6,331,765 B1 | 12/2001 | Yamamoto et al. | |
| 7,642,757 B2 | 1/2010 | Yoon et al. | |
| 8,164,221 B2 | 4/2012 | Johansson | |
| 8,390,968 B2 | 3/2013 | Dorn et al. | |
| 9,366,715 B2 | 6/2016 | Ukil et al. | |
| 9,379,556 B2 | 6/2016 | Haensgen et al. | |
| 9,599,654 B2 | 3/2017 | Park et al. | |
| 9,851,737 B1 | 12/2017 | Wilson et al. | |

(Continued)

*Primary Examiner* — Harry R Behm
(74) *Attorney, Agent, or Firm* — Womble Bond Dickinson (US) LLP

(57) ABSTRACT

Methods and systems for protecting one or more flexible alternating current transmission system (FACTS) devices in a high voltage (HV) power transmission line are disclosed. The system may include a circuit breaker to de-energize the HV power transmission line when a fault current is detected on the HV power transmission line, and to determine whether the fault current has cleared. The system may further include a power supply to harvest energy from the fault current. The system may further include a bypass switch coupled to protect the FACTS devices by providing a controllable conduction path around the FACTS devices when the bypass switch is activated. And the system may further include a fault current harvesting circuit (FHC) and an actuator operating in conjunction to control the bypass switch based on the harvested energy.

17 Claims, 6 Drawing Sheets

(56) References Cited

U.S. PATENT DOCUMENTS

| | | | |
|---|---|---|---|
| 2003/0006652 A1* | 1/2003 | Couture | H02G 7/20 |
| | | | 307/125 |
| 2012/0176712 A1* | 7/2012 | Kim | H02H 1/0015 |
| | | | 361/60 |
| 2016/0209454 A1 | 7/2016 | McCammon et al. | |
| 2017/0162320 A1* | 6/2017 | Rumrill | G01R 15/207 |
| 2018/0106851 A1 | 4/2018 | Schweitzer, III et al. | |
| 2020/0014190 A1* | 1/2020 | Wen | H02J 1/00 |

* cited by examiner

ENERGY HARVESTING FROM FAULT CURRENTS

CROSS REFERENCE TO RELATED APPLICATIONS

This application claims the benefit of U.S. Provisional Application No. 62/691,234 filed on Jun. 28, 2018, the disclosure of which is incorporated herein by reference.

TECHNICAL FIELD

Embodiments of the present disclosure relate to systems and methods for flexible alternating current (AC) transmission systems (FACTS), and more specifically, relate to fault protection of FACTS devices.

BACKGROUND

There is an emphasis on better utilization of available AC transmission infrastructures due to the socio-economic problems, such as environmental clearance, the right of way, large capital investments, in laying and commissioning of new transmission lines. FACTS devices can provide reactive power compensation, improve transmission efficiency, and enhance voltage and stability of AC transmission systems. FACTS devices provide more granular and faster control than electro-mechanical devices such as phase-shifting transformers and thus have become critical for improving the efficiencies of the power grid. FACTS devices are highly complex semiconductor-based devices that operate in either series or shunt modes. FACTS devices require long planning cycles and careful design before installation.

Most FACT devices are custom-built and have a unique design for fault handling. Fault handling strategy of FACTS devices is a deterrent to the large-scale adoption of these devices. During a typical fault on AC transmission lines very high currents appear on the lines. Fault conditions can be transitory or can appear for extended periods. Electronic components in the FACTS devices need to be protected by fault protection circuitry as they can fail due to the very high fault currents which are in the order of thousands of Amperes. Fault protection circuitry includes fast-acting and robust switches such as silicon-controlled rectifiers (SCRs), electro-mechanical switches, etc. The protection circuitry may also include metal-oxide varistors (MOVs) to shunt excessive currents. MOV's resistance varies with the applied voltages and provides a very high-resistance when triggered.

FIG. 1 shows a prior art implementation of FACTS devices based power grid system and includes protection as a part of the system. Referring to FIG. 1, system 100 includes a generator 101 and a transformer 110-01 for stepping up the voltage for transmission over the transmission line 105. A circuit breaker (CB)/auto recloser (AR) 120-01 is used to isolate the generator 101 from transmission line 105 and any FACTS devices 130-01 and 130-02 in case of a fault. A second CB/AR 120-02 is used to isolate the power grid from the rest of the system (transformer 110-02, generator 102, etc.). In FIG. 1, FACTS device 130-01 is connected in shunt whereas the device 130-02 is connected in series. Examples of series connected FACTS device 130-01 include static synchronous series compensator (SSSC), thyristor-controlled series compensators (TCSC), thyristor switched series capacitor (TSSC), thyristor-controlled series reactor, etc. TCSC can control the reactance of a transmission line thereby controlling line power flow. Examples of shunt connected FACTS device 130-01 include static synchronous compensator (STATCOM), static VAR compensator (SVC), etc. Some FACTS devices such as unified power flow controller (UPFC) are connected in both series and shunt. During regular operation, the FACTS devices 130-01 and 130-02 provide the capability for the line to be efficiently used for transfer of power. When there is a fault, the CB/AR 120-01 is opened to protect the system 100. The CB/AR 120-01 is closed multiple times to determine if the fault has cleared. During the reclose attempts the FACTS devices 130-01 and 130-02 need to withstand the fault currents and also for the duration of the reclose attempt.

FIG. 2 is a prior art example of a fault current protection circuit including a series capacitor bank (or series capacitive compensation) for the inductance of the power lines. As can be seen circuit 200 includes a capacitor 202 in series with the transmission line 105, an MOV bank 203 and a triggered gap 205. The triggered gap 205 (e.g. vacuum bottle) is in series with an inductance 204 and is used to limit the current through the triggered gap 205 or in the case of longer time periods the bypass CB 206.

FIG. 3 is a prior art example of a fault current protection system having a single TCSC unit associated with a fault current protection circuitry. In FIG. 3, fault current protection system 300 includes a TCSC 307 connected with a bypass switch 306, and in combination with an inductor 305 coupled in parallel with a capacitor 304 is able to inject both capacitive or inductive impedances on transmission line 105 based on the firing of the thyristors, the control being provided by the firing angle and duration. TCSC 307 may be included as part of FACTS device 130 of FIG. 1. The protection circuitry includes the MOV 203, the triggered air or vacuum gap 205, and the bypass breaker 206. The triggered air gap 205 and the bypass breaker 306 have a damping circuit 204 to reduce oscillations and provide a current limit. In addition to the fault current protection, system 300 also includes circuit breakers 303A and 303B which allow the TCSC 307 to be disconnected from transmission line 105 and a re-closer breaker 120 for reconnecting the TCSC 307 when the fault is repaired. Still referring to FIG. 3, system 300 also includes a control block (or circuitry) 308 used to fire the TCSC 307. The control block 308 also controls the other components in the fault current protection circuitry such as bypass switch 306. The control block 308 includes a microcontroller unit (MCU) and also a communication module for coordination, etc.

Typically, control block 308 is powered by external power supply such as battery pack. This external supply adds to the design, manufacturing, installation, and maintenance costs. The protection circuitry (MOV 203, triggered gap 205, etc.) of the FACTS device 130 and its associated control circuitry not only increase complexity of the FACTS device 130 but also increase the weight resulting in added manufacturing and installation costs of the FACTS device 130. This issue is worsened when the FACTS device 130 and its control circuitry 308 operate by extracting power from the transmission line 105, as the FACTS device 130 and its control circuitry 308 are not operational during auto-reclosing. In this case, both the FACTS device 130 and its control circuitry 308 need to be protected from the fault current during reclose attempts. Therefore, there is a need for a more optimal protection scheme that reduces the complexity, weight, and cost for FACTS devices.

BRIEF DESCRIPTION OF THE DRAWINGS

Embodiments of the disclosure are illustrated by way of example and not limitation in the figures of the accompanying drawings in which like references indicate similar elements. The drawings are made to point out and distinguish the invention from the prior art. The objects, features and advantages of the embodiments are detailed in the description taken together with the drawings.

DETAILED DESCRIPTION

Figure 1:
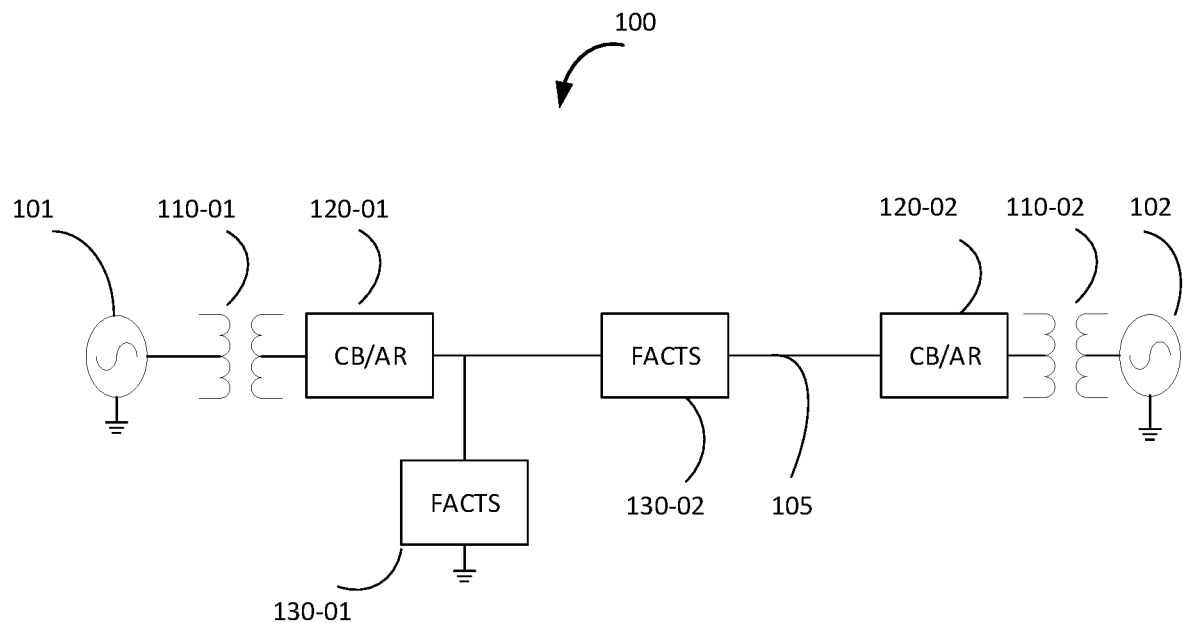
FIG. 1 is a prior art system block diagram 100 of FACTS devices with circuit breaker and auto-recloser protections as part of a power grid system.
Figure 2:
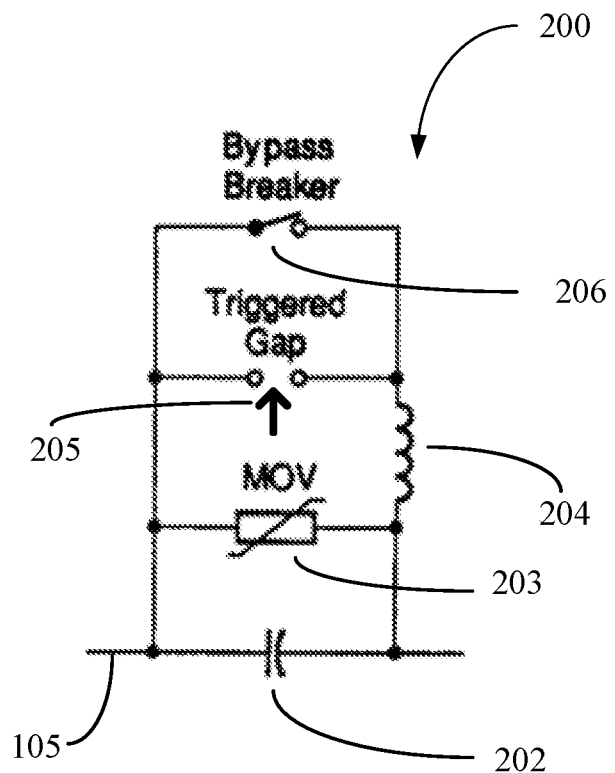
FIG. 2 is a prior art block diagram 200 of a fault current protection circuit including a series capacitor bank.
Figure 3:
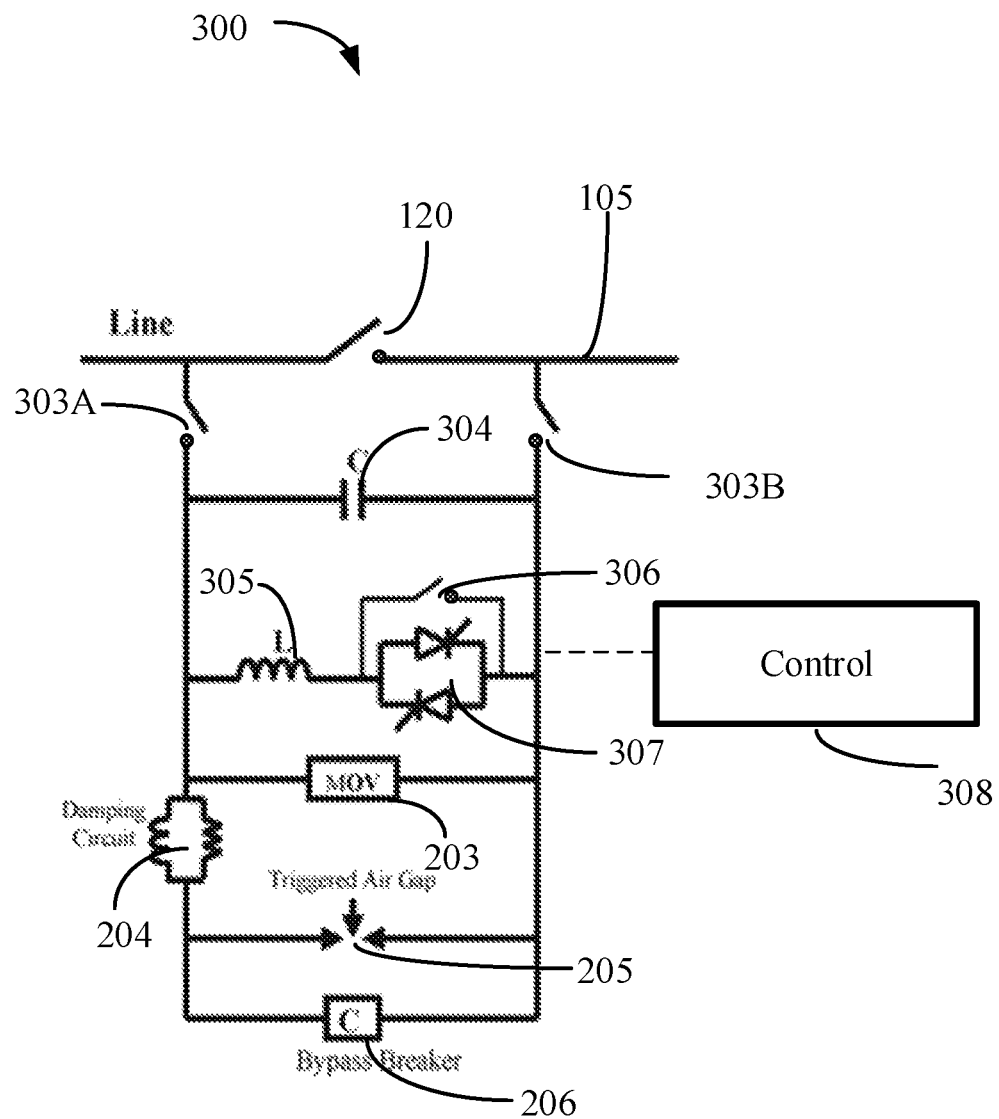
FIG. 3 is an exemplary prior art block diagram 300 of a fault current protection system including a fault current protection circuitry.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The key differentiation is to harvest and use fault currents to enable protection to FACTS devices when the main control circuits are not operational. This reduces the complexity and weight of the FACTS devices by eliminating MOV, Air-gap, etc.

Flexible AC Transmission Systems (FACTS) devices, along with their protection and associated control circuitry can function by extracting power from the transmission line. However, this puts the control circuitry in the direct path of any fault events. In this case, when a fault occurs, protection for FACTS device is engaged and both the FACTS device and its associated circuits must be bypassed or protected by other means. Typically, auto-reclosing is done multiple times to determine if the fault clears by itself. During auto-reclosing, if the fault has not cleared, the FACTS device must withstand the full fault current and also withstand the duration of the reclosing for all attempts. Accordingly, systems and methods that use the fault current to power ancillary control circuits are disclosed. The ancillary control circuits enable protection of one or more FACTS devices while the main control circuits are not operational.

According to some embodiments, a method of protecting one or more FACTS devices in a high voltage (HV) power transmission line is described. In one embodiment, in response to detecting a fault current on the HV power transmission line, a circuit breaker is opened to de-energize the HV power transmission line. The circuit breaker is auto-reclosed to determine whether the fault current has cleared. During the auto-reclosing of the circuit breaker, energy from the fault current is harvested, and a bypass switch coupled to the FACTS devices is controlled based on the harvested energy in order to protect the FACTS devices.

According to another embodiment, a fault current protection system for protecting one or more FACTS devices in an HV power transmission line is described. The system includes a circuit breaker to de-energize the HV power transmission line when a fault current is detected on the HV power transmission line, and to determine whether the fault current has cleared. The system further includes a power supply to harvest energy from the fault current. The system further includes a bypass switch coupled to protect the FACTS devices by providing a controllable conduction path around the FACTS devices when the bypass switch is activated. And the system further includes a fault current harvesting circuit (FHC) and an actuator operating in conjunction to control the bypass switch based on the harvested energy.

Figure 4:
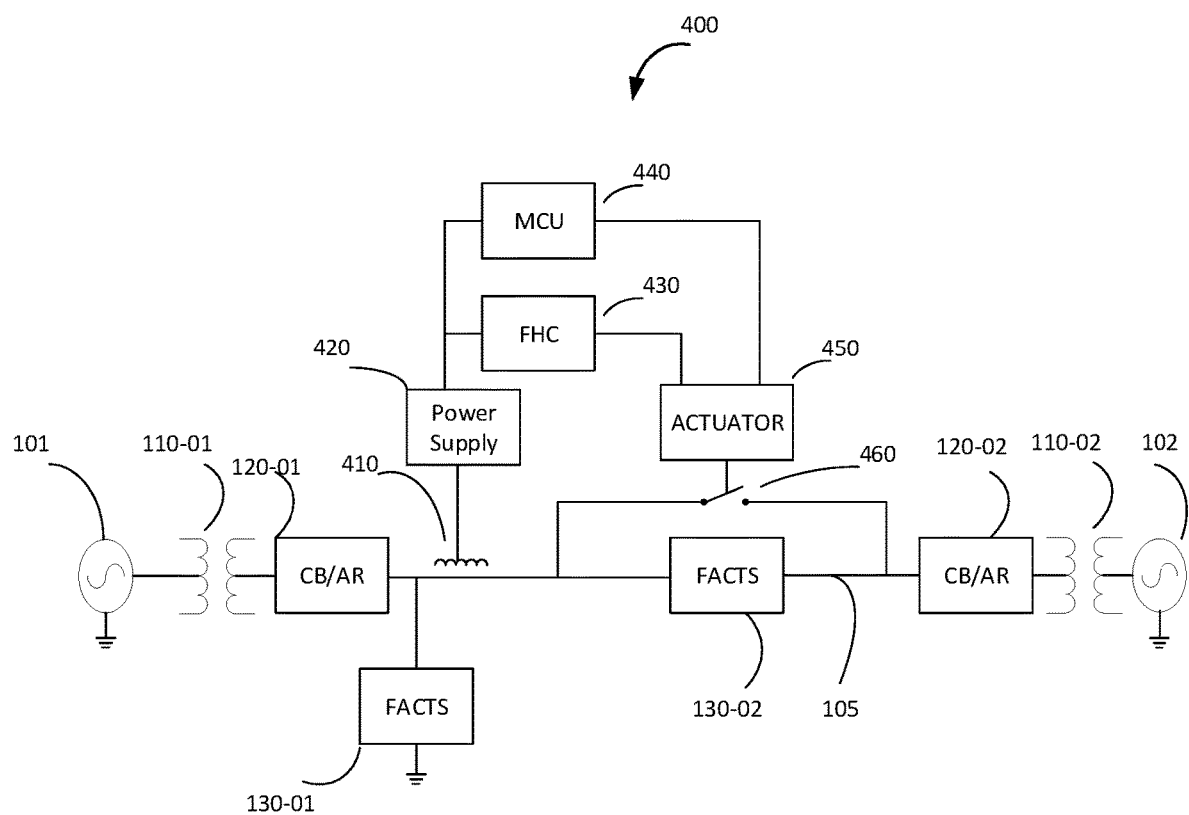
FIG. 4 is an exemplary block diagram of a system 400 showing a fault current harvesting circuit (FHC) based protection of FACTS device according to one embodiment.

FIG. 4 is an exemplary block diagram of a system having a fault current harvesting circuit (FHC) based protection of a FACTS device according to one embodiment. In one embodiment, system 400 shown in FIG. 4 is similar to system 100 (FIG. 1) with the major exception being FACTS device 130-02 is now protected by an FHC-based circuit. The FHC based circuit may replace the MOV, air-gap, etc. based protection. In one embodiment, the FHC-based circuit extracts power from transmission line 105 via a current transformer (CT) 410. CT 410 produces a current in its secondary winding which is proportional to the current in its primary winding. A current transformer presents a negligible load to the primary circuit. Currents generated during a fault is very large (e.g., ~60,000 KA), and CT 410 is designed so that the value of the current on the secondary side is safe to be driven into the power supply 420. Example of primary to secondary ratio in CT 410 is 60:1, which allows power supply 420 to harvest energy from fault currents, which may be in the order of 1500 A. Power supply 420 is designed to handle the currents generated during a fault condition as well as normal operation. Power supply 420 drives both FHC 430 as well as micro controller unit (MCU) 440. During normal operation, the MCU 440 is active and serves as the primary control for protection to the FACTS device 130-02. MCU 440 includes appropriate sensors, level shifter, drivers, etc. to enable primary protection by driving actuator 450. The actuator 450 in turn drives a bypass switch 460. The bypass switch 460 may be left open during normal operation. The MCU 440 can close the bypass switch 460 via the actuator 450 to bypass and protect FACTS device 130-02. During auto-reclosing, due to the long boot-up time associated with the MCU, the FACTS device 130-02 is protected by power supply 420 in conjunction with FHC 430. The power supply 420 and FHC 430 drive the actuator 450 to control the bypass switch 460 in order to protect FACTS device 130-02. This protection may be referred to as the ancillary or secondary protection.

When a fault occurs on the transmission line 105, there is large surge (fault) current that travels through the transmission line 105. In response to the fault, the CB/AR 120-01 may open to de-energize the transmission line 105. As the transmission line 105 is de-energized the primary control (MCU 440) that protects FACTS device 130-02 is inactive (e.g., powered down). CB/AR 120-01 is reclosed to check if the fault has cleared. During auto-reclosing, MCU 440 is automatically booted up (e.g., powered on), though there may be a lengthy boot-up time (e.g., in the order of milliseconds to seconds) associated with the MCU 440. If the fault has not cleared, for example there may exist a fault current on the transmission line 105 that can last up to several seconds (e.g., 3 to 5 seconds), CB/AR 120-01 may reopen. Therefore, MCU 440 may again be inactive (e.g., powered down) and FACTS device 130-02 continues to be protected by power supply 420 in conjunction with FHC 430. Auto-reclosing can occur multiple times (e.g., around 5 times) to determine if the fault has cleared. If so, CB/AR 120-01 remains closed and MCU 440 continues to boot-up. The equipment on the transmission grid including the FACTS devices 130 are generally designed to ride through the duration of this fault current during auto-reclosing using schemes similar to those previously described.

Figure 5:
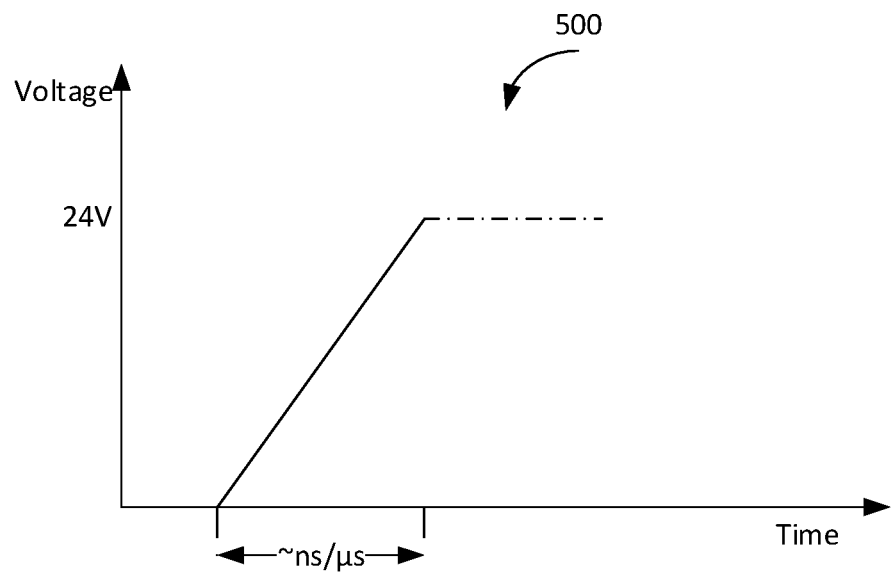
FIG. 5 is an exemplary plot showing the output of a power supply in the system 400 shown in FIG. 4.

In some embodiments, energy from the fault current is harvested to enable a very fast switching of bypass switch 460 to protect the FACTS device 130-02. In order to protect the device 130-02 during auto-reclosing, the power supply 420 along with FHC 430 drive the actuator 450. More importantly, power supply 420 along with FHC 430 provides an output ramp voltage relative to a fast output ramp time. The output ramp time of the power supply 420 may be in the order of nanoseconds (ns). Power supply 430 may include components such as RFC (to protect the transmission line 105), analog comparators, and boost-rectifiers to obtain fast output ramp times. FIG. 5 is an exemplary plot 500 showing the output of the power supply 420 in the system 400 shown in FIG. 4, where the output voltage ramp time is in nanoseconds and enables FHC 430 to provide a stable voltage to drive the actuator 450.

In order to obtain to obtain fast switching, semiconductor switches (such as MOSFETs, IGBTs, SCRs, etc.) and/or mechanical switches (e.g., vacuum interrupter) may be used as bypass switch 460. In one embodiment, a semiconductor switch and a mechanical switch may operate in tandem to create bypass switch 460.

Figure 6:
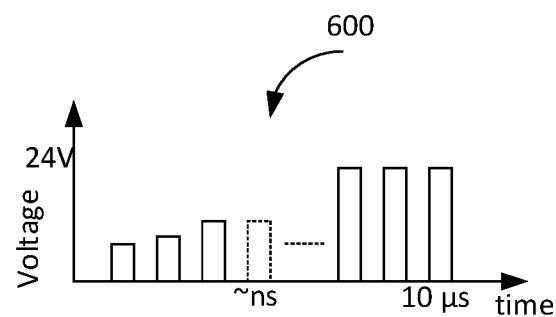
FIG. 6 is an exemplary plot showing the output of the FHC in the system 400 shown in FIG. 4.

FIG. 6 is an exemplary plot showing the output of the FHC 430 in the system 400 shown in FIG. 4. Semiconductor switches like MOSFETs, IGBTs, SCRs need a specific pulse train to operate. Plot 600 in FIG. 6 shows an exemplary pulse train generator output from the FHC 430. As shown in FIG. 6, FHC 430 provides a stable output voltage (e.g., voltage pulse train with each pulse having a pulse width in the order of nanoseconds) with minimal overshoot (e.g., <10%). This enables the fast switching of bypass switch 460. During auto-reclosing, FHC 430 is activated and can drive the actuator 450 to close the bypass switch 460, thus bypassing the FACTS device 130-02 and providing protection to FACTS device 130-02. The fast output voltage ramp time of the FHC 430 enables secondary control to protect the FACTS device 130-02, while the primary control MCU 440 is not operational. This allows the FACTS device to eliminate protection, such as MOV, etc., thus reducing complexity, weight while making the FACTS device more modular.

Figure 7:
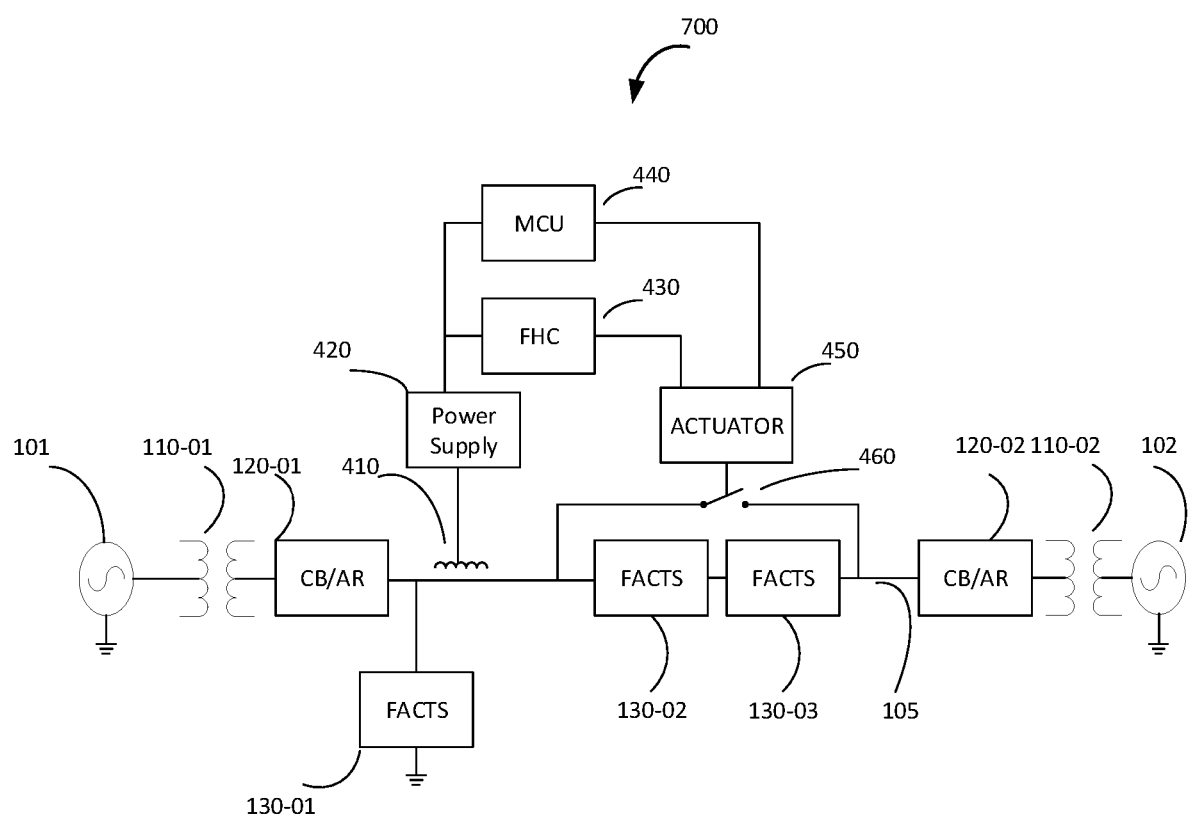
FIG. 7 is an exemplary block diagram of the system 700 having multiple FACTS devices connected in series, with the FACTS devices being protected by a single FHC according to one embodiment.

FIG. 7 is an exemplary block diagram of the system 700 having multiple FACTS devices coupled or connected in series. In FIG. 7, FACTS devices 130-02 and 130-03 are protected by a single FHC in one embodiment. System 700 may be similar to system 400 described in FIG. 4 with the exception that a single FHC is protecting multiple FACTS devices 130-02 and 130-03. It should be noted that while system 700 includes two FACTS devices 130-02 and 130-03 being protected by FHC 430, any number of FACTS devices may be protected by FHC 430 in system 700. As shown, FACTS devices 130-02 and 130-03 are connected in series to the transmission line 105, where the FACTS devices are protected by a single bypass switch 460. The bypass switch 460 is controlled by FHC 430 as discussed previously. Other configurations are possible in some embodiments, e.g., two respective bypass switches can be used to provide bypass protection to each of the FACTS devices 130-02 and 130-03 individually, while still being controlled by the FHC 430. Even though the discussion so far is for FACTS devices operating in series, it will be understood by those skilled in the art that the FHC-based protection can be extended to FACTS devices operating in shunt as well.

The embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 8:
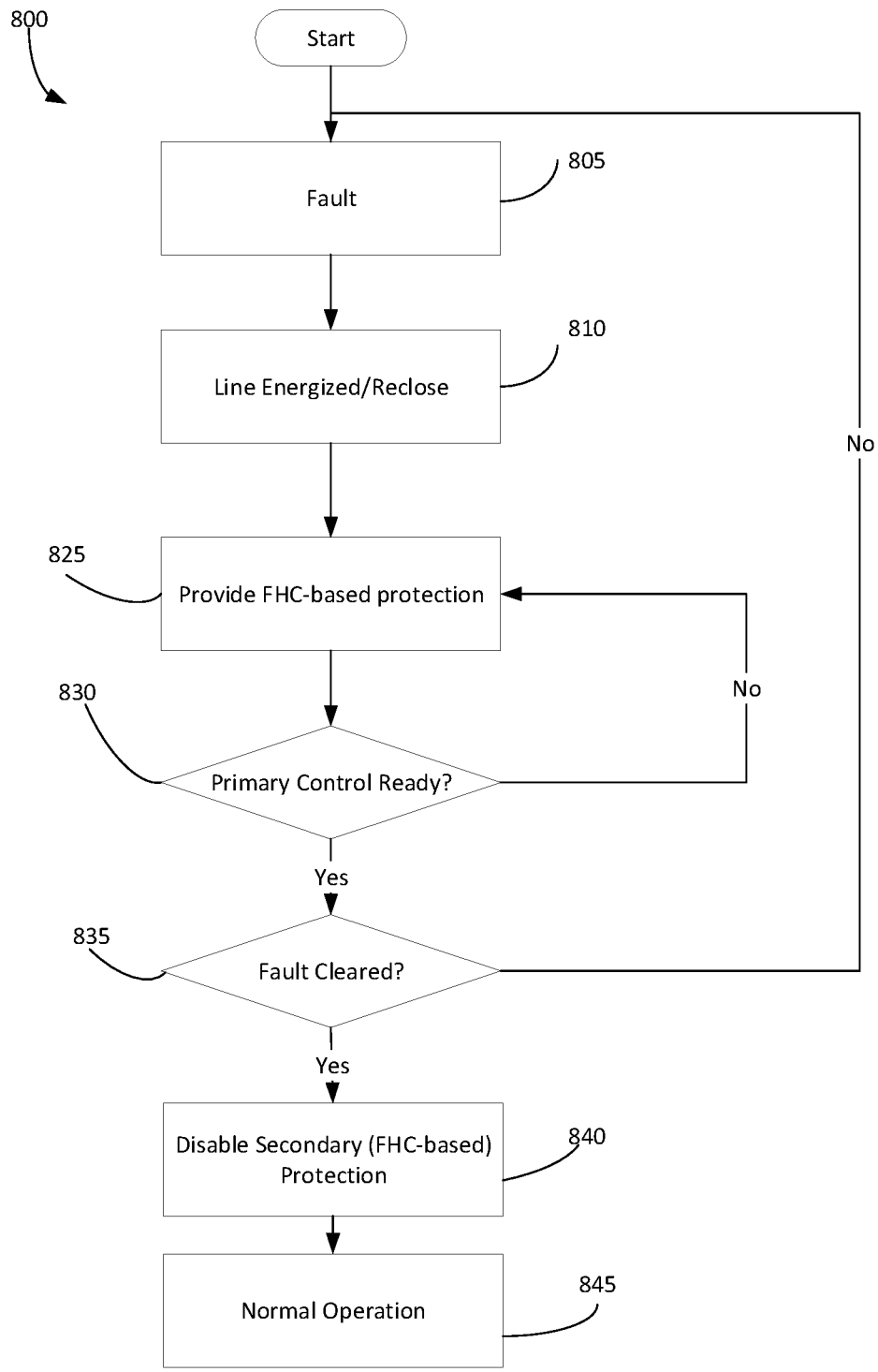
FIG. 8 is an exemplary method to enable FHC based protection of a FACTS device according to one embodiment.

FIG. 8 is an exemplary method to enable FHC-based protection of a FACTS device according to one embodiment.

Referring to FIG. 8, method 800 starts in block 805 when there is a fault and CB/AR 120-01 is open. The primary protection provided by MCU 440 is inactive as transmission line 105 is de-energized, as previously described. In block 810, the CB/AR 130 is closed to determine if the fault has cleared by itself. This step will energize the line with either a surge current or normal current. As MCU 440 is still inactive, FACTS device 130-02 (and FACTS device 103-03 in system 700) is protected by FHC 430 based circuit (block 825). As described previously, the power supply 420 provides an output with a ramp time is in nanoseconds and enables FHC 430 to provide a stable voltage to drive the actuator 450. In block 830, method 800 determines whether MCU 440 has booted up and ready for operation. As previously described, MCU 440 is automatically booted up during auto-reclosing of CB/AR 120, though it may take a lengthy amount of time (e.g., in the order of milli-seconds to seconds) for the MCU 440 to be operational in order to protect FACTS device 130-02 (and FACTS device 103-03 in system 700). If MCU 440 is not ready, then FHC 430-based protection continues to protect FACTS device 130-02 (and FACTS device 103-03 in system 700). Once MCU 440 is ready, it provides the primary protection by driving the actuator 450 and disables the protection by FHC 430. In block 835, MCU 440 checks to determine if the fault has cleared (e.g., CB/AR 120-01 is closed). If the fault is cleared then the secondary protection, as provided by FHC 430, is disabled (block 840). Bypass switch 460 is opened, thereby allowing for normal operation (block 845).

Even though embodiments of the invention disclosed are described using specific implementation, it is intended only to be exemplary and non-limiting. The practitioners of the art will be able to understand and modify the same based on new innovations and concepts, as they are made available. The invention is intended to encompass these modifications.

Thus, the present disclosure has a number of aspects, which aspects may be practiced alone or in various combinations or sub-combinations, as desired. Also, while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. A method of protecting one or more flexible alternating current transmission system (FACTS) devices in a high voltage (HV) power transmission line, the method comprising:
   (i) in response to detecting a fault current on the HV power transmission line, opening a circuit breaker to de-energize the HV power transmission line;
   (ii) auto-reclosing the circuit breaker to determine whether the fault current has cleared; and
   (iii) during the auto-reclosing of the circuit breaker, harvesting energy from the fault current, and controlling a bypass switch coupled to the FACTS devices based on the harvested energy in order to protect the FACTS devices;
   wherein harvesting energy from the fault current comprises: using a current transformer to extract power from the HV power transmission line, to produce a current in a secondary winding of the current transformer that is proportional to a current in a primary winding of the current transformer, and to drive the current in the secondary winding of the current transformer into a power supply that harvests the energy from the fault current;
   wherein controlling the bypass switch coupled to the FACTS devices comprises: using a fault current harvesting circuit (FHC) to generate a voltage pulse train based on an output ramp voltage provided by the power supply, and to drive an actuator using the generated voltage pulse train;
   wherein the actuator performs fast switching of the bypass switch during the auto-reclosing of the circuit breaker.

2. The method of claim 1, wherein the output ramp voltage is relative to a fast output ramp time.

3. The method of claim 1, wherein each pulse in the voltage pulse train has a pulse width in the order of nanoseconds.

4. The method of claim 1, further comprising:
   determining whether a microcontroller unit (MCU) has booted up and is ready for operation;
   in response to determining that the MCU has booted up and is ready for operation, further determining whether the fault current has cleared;
   otherwise in response to determining that the MCU has not booted up or is not ready for operation, repeating (iii).

5. The method of claim 4, further comprising:
   in response to determining that the fault current has cleared, disabling (ii) and (iii) and opening the bypass switch, wherein the bypass switch is controlled by an actuator driven by the MCU;
   otherwise in response to determining that the fault current has not cleared, repeating (i)-(iii).

6. The method of claim 4, wherein the MCU is inactive when the fault current is detected on the HV power transmission line.

7. The method of claim 1, wherein the bypass switch is created using a semiconductor switch, a mechanical switch, or both.

8. The method of claim 1, wherein the auto-reclosing of the circuit breaker occurs for a plurality of times to determine whether the fault current has cleared.

9. The method of claim 1, further comprising: closing the circuit breaker to energize the HV power transmission line.

10. A fault current protection system for protecting one or more flexible alternating current transmission system (FACTS) devices in a high voltage (HV) power transmission line, the system comprising:
    a circuit breaker to de-energize the HV power transmission line when a fault current is detected on the HV power transmission line, and to determine whether the fault current has cleared;
    a power supply to harvest energy from the fault current;
    a bypass switch coupled to protect the FACTS devices by providing a controllable conduction path around the FACTS devices when the bypass switch is activated;
    a fault current harvesting circuit (FHC) and an actuator operating in conjunction to control the bypass switch based on the harvested energy; and
    a current transformer to extract power from the HV power transmission line, to produce a current in a secondary winding of the current transformer that is proportional to a current in a primary winding of the current transformer, and to drive the current in the secondary winding into the power supply in order to harvest energy from the fault current;
    wherein to control the bypass switch, the FHC generates a voltage pulse train based on an output ramp voltage provided by the power supply, and drives the actuator using the generated voltage pulse train, wherein the actuator performs fast switching of the bypass switch during the auto-reclosing of the circuit breaker.

11. The system of claim 10, wherein the circuit breaker is opened de-energize the HV power transmission line, and auto-reclosed to determine whether the fault current has cleared.

12. The system of claim 11, wherein the circuit breaker auto-recloses for a plurality of times to determine whether the fault current has cleared.

13. The system of claim 10, wherein the output ramp voltage is relative to a fast output ramp time.

14. The system of claim 10, wherein each pulse in the voltage pulse train has a pulse width in the order of nanoseconds.

15. The system of claim 10, further comprising: a microcontroller unit (MCU) to determine whether there exists a fault current on the HV power transmission line, and to control the bypass switch if there is no fault current on the HV power transmission line.

16. The system of claim 15, wherein the MCU is inactive if there is a fault current on the HV power transmission line.

17. The system of claim 10, wherein the bypass switch is created using a semiconductor switch, a mechanical switch, or both.

* * * * *